United States Patent
Koo et al.

(10) Patent No.: US 6,831,909 B1
(45) Date of Patent: Dec. 14, 2004

(54) CHANNEL ASSIGNING DEVICE AND METHOD IN CDMA COMMUNICATION SYSTEM

(75) Inventors: Chang-Hoi Koo, Kyonggi-do (KR); Dae-Gyun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/431,427

(22) Filed: Nov. 1, 1999

(30) Foreign Application Priority Data

Dec. 7, 1998 (KR) .......................................... 98-54052

(51) Int. Cl.[7] .................................................. H04H 1/00
(52) U.S. Cl. ...................... 370/339; 370/329; 370/335; 370/342; 455/450
(58) Field of Search ................................. 370/339, 335, 370/328, 329, 341, 342, 431, 441; 455/450, 434, 435, 451, 452, 453

(56) References Cited

U.S. PATENT DOCUMENTS 5,212,803 A * 5/1993 Uddenfeldt et al. ......... 455/434
5,991,285 A * 11/1999 Ghosh ......................... 370/335
6,266,321 B1 * 7/2001 Pehkonen et al. ........... 370/206
6,374,112 B1 * 4/2002 Widegren et al. ............ 455/452
6,442,152 B1 * 8/2002 Park et al. .................... 370/341
6,469,993 B1 * 10/2002 Seo et al. ..................... 370/329
6,477,157 B1 * 11/2002 Kim et al. .................... 370/331

* cited by examiner

*Primary Examiner*—Dwayne Bost
*Assistant Examiner*—Lewis G West
(74) *Attorney, Agent, or Firm*—Dilworth & Barrese, LLP (57) ABSTRACT

A channel assigning device and method in a CDMA communication system is described. According to one aspect of the present invention, in a channel assigning method for a base station, the base station establishes a first dedicated channel and communicates with a mobile station on the established dedicated channel. Then, the base station determines the type of a second dedicated channel and channel spreading code information upon request for additional assignment of a second dedicated channel while in the conversation state, assigns the second dedicated channel, and generates a channel assignment message including the determined channel assignment mode and channel spreading code information to assign the second dedicated control channel. The base station transmits the channel assignment message to the mobile station on the first dedicated channel.

30 Claims, 10 Drawing Sheets

| FIELD | LENGTH (BITS) |
|---|---|
| MSG_TYPE | 8 |
| ACK_SEQ | 3 |
| MSG_SEQ | 3 |
| ACK_REQ | 8 |
| ADD_RECORD_LEN | 8 |
| ASSIGN_MODE | 2 |
| ADDITIONAL RECORD FIELDS | 8 X(ADD_RECORD_LEN − 1) |

| RESERVED | 2 |
|---|---|

| VALUE (BINARY) | ASSIGNMENT MODE |
|---|---|
| 00 | FUNDAMENTAL CHANNEL ASSIGNMENT |
| 01 | DEDICATED CONTROL CHANNEL ASSIGNMENT |
| ALL OTHER VALUES ARE RESERVED | |

FIG.8

| FIELD | LENGTH (BITS) |
|---|---|

IF ASSIGN_MODE='00', THE ADDITIONAL RECORD FIELD SHALL BE:

| NUM_PILOTS | 3 |
|---|---|

NUM_PILOTS PLUS ONE OCCURRENCES OF THE FOLLOWING RECORD:

| PILOT_PN | 9 |
|---|---|
| PWR_COMB_IND | 1 |
| CODE_CHAN_FCH | 10 |

| RESERVED | 0-7 (AS NEEDED) |
|---|---|

FIG.9

| FIELD | LENGTH (BITS) |
|---|---|

IF ASSIGN_MODE='01', THE ADDITIONAL RECORD FIELD SHALL BE:

| | |
|---|---|
| NUM_PILOTS | 3 |

NUM_PILOTS PLUS ONE OCCURRENCES OF THE FOLLOWING RECORD:

| | |
|---|---|
| PILOT_PN | 9 |
| PWR_COMB_IND | 1 |
| CODE_CHAN_DCCH | 10 |
| QOF_MASK_ID_DCCH | 2 |

| | |
|---|---|
| RESERVED | 0-7 (AS NEEDED) |

FIG.10

CHANNEL ASSIGNING DEVICE AND METHOD IN CDMA COMMUNICATION SYSTEM

PRIORITY

This application claims priority to an application entitled "Channel Assigning Device and Method in CDMA Communication System" filed in the Korean Industrial Property Office on Dec. 7, 1998 and assigned Serial No. 98-54052, the contents of which are hereby incorporated by reference.

BACKGROUND OF THE INVENTION

1. Field of the Invention

The present invention relates generally to a communication device and method in a CDMA (Code Division Multiple Access) communication system, and in particular, to a device and method for assigning a channel while in a conversation state.

2. Description of the Related Art

The next-generation CDMA mobile communication system will use more channels than the present CDMA communication system. The CDMA link is comprised of common channels and dedicated channels. The dedicated channels include a fundamental channel (FCH) for processing a voice signal, a supplemental channel for transmission of packet data, and a dedicated control channel (DCCH) for transmission of control information.

In the next-generation CDMA mobile communication system, some mobile stations (MSs) can request fundamental channels and other MSs can request dedicated control channels. There will exist MSs which can request both the fundamental channels and the dedicated control channels concurrently, depending on their BSPs (Bearer Service Profiles). Here, the fundamental channel can transmit voice and the dedicated control channel can transmit packet data.

However, the dedicated control channel cannot be requested, let alone both the dedicated channel and the fundamental channel concurrently, in the IS-95 CDMA scheme. If an MS sequentially requests a fundamental channel and a dedicated control channel, the first requested channel can be assigned on a paging channel but the next requested channel cannot be assigned on the paging channel. That is, while a communication is in progress using a dedicated channel, a fundamental channel or a dedicated control channel should be assigned on the dedicated channel in the communication state. Therefore, a method is needed in which a fundamental channel or dedicated control channel assignment message is transmitted/received on a channel other than a paging channel, for channel assignment.

To add new dedicated channels (fundamental channels or dedicated control channels in the communication state), there is a need for an encoding method which can increase channel capacity. One way to increase system capacity in the CDMA communication system is through channelization, which is provided by use of orthogonal codes. The orthogonal codes can be Walsh codes, as are the orthogonal channels in the forward link of the IS-95 standard, for example.

Orthogonal channelization is provided in an IS-95 communication system to the forward link by establishing a transmission channel and notifying the channel receiving device of the established channel by a channel transmitting device. The following description is conducted on the assumption that the transmitting device is a base station (BS) and the receiving device is an MS. Each transmission and reception channel on the forward link is distinguished by its assigned orthogonal code. It is also assumed that each channel on the IS-95 forward link is convolutionally encoded and a modulator performs BPSK (Bi-Phase Shift Keying) modulation. The bandwidth used is 1.2288 MHz and the data rate is 9.6 kbps, in the IS-95 system. Therefore, 64 channels (=1.2288M/(9.6 k×2)) on an IS-95/IS-95A forward link are distinguished by 64 orthogonal codes.

To operate the CDMA system having the above channel structure, channel assignment and channel release should be implemented accurately and stably, and a mobile capability should be considered for requesting and assigning a fundamental channel and a dedicated control channel between a BS and an MS. However, the above scheme limits the number of available channels, due to the limited number of orthogonal codes available. Quasi-orthogonal codes, which provide minimized interference with the orthogonal codes, can be used to overcome the above problem. The length of an orthogonal code varies with the data rate in mobile communication systems which use a variable data rate. Therefore, it is preferable to use quasi-orthogonal codes due to its advantage of minimum interference with orthogonal codes.

However, a transmitting/receiving device in an IS-95 communication system is configured without considering the possibility of using quasi-orthogonal codes for assigning a forward link channel. Thus, a different channel assignment scheme or transmitting/receiving device is needed for application of the quasi-orthogonal codes.

SUMMARY OF THE INVENTION

It is, therefore, a first object of the present invention to provide a channel assigning device and method for a BS in a CDMA communication system, in which the BS uses a dedicated channel currently in use in order to send setup information about assigning another dedicated channel.

It is a second object of the present invention to provide a channel assigning device and method for a BS in a CDMA communication system, in which the BS uses a dedicated channel in current use in order to send setup information about assigning another dedicated channel to an MS, when the MS requests assignment of another dedicated channel while in a conversation state.

It is a third object of the present invention to provide a channel assigning device and method for an MS in a CDMA communication system, in which upon receipt of a channel assignment message on a channel in current use, the MS assigns a corresponding channel indicated by the channel assignment message from the base station.

It is a fourth object of the present invention to provide a channel assigning device and method for an MS in a CDMA communication system, in which the MS requests assignment of another channel in a conversation state, and assigns the channel upon receipt of a channel assignment message on a channel in current use.

It is a fifth object of the present invention to provide a channel assigning device and method for a BS in a CDMA communication system, in which the BS can selectively assign an orthogonal code or a quasi-orthogonal code for a dedicated channel depending on the amount of channel use.

It is a sixth object of the present invention to provide a channel assigning device and method for an MS in a CDMA communication system, in which the MS can selectively assign an orthogonal code or a quasi-orthogonal code for a dedicated channel depending on the amount of channel use.

To achieve the above objects, there is provided a channel assigning device and method in a CDMA communication system. According to an embodiment of the present invention, in a channel assigning method for a base station, the base station establishes a first dedicated channel and communicates with a mobile station on the established first dedicated channel. Then, the base station determines the type of a second dedicated channel and channel spreading code information upon request for additional assignment of the second dedicated channel while in the conversation state, assigns the second dedicated channel, and generates a channel assignment message including the determined channel assignment mode and channel spreading code information to assign the second dedicated control channel. The base station transmits the channel assignment message to the mobile station on the first dedicated channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail to avoid obscuring the invention in unnecessary detail.

An embodiment of the present invention pertains to a CDMA mobile communication system and discloses a method of assigning a fundamental channel (or dedicated control channel) on a paging channel and then a dedicated control channel (or fundamental channel) on the fundamental channel (or dedicated control channel) established between a BS and an MS. In addition, an embodiment of the present invention discloses a message format used in the assignment procedure, and a transmitting/receiving device in the BS/MS in order to increase the performance of the system, which is capable of using both the fundamental channel and the dedicated control channel at the same time.

In an embodiment of the present invention, quasi-orthogonal codes are generated, allowing minimum interference with orthogonal codes, and applied to a CDMA communication system such that the system's capacity is increased and the capacity of a single cell is maximized. Quasi-orthogonal code generating methods are disclosed in detail in Korea Patent No. 97-46406 and No. 98-29576.

An embodiment of the present invention also provides a method of sequentially assigning dedicated channels to an MS and processing the assigned dedicated channel in the MS, as well as providing a message format and process for assigning a channel on the assigned dedicated channel. A message for assigning a dedicated control channel or a fundamental channel using the presently assigned dedicated channel is termed a general channel assignment message.

An embodiment of the present invention includes logical process logic for determining whether quasi-orthogonal codes are to be used or not, a BS forward link channel transmitting device for generating the quasi-orthogonal codes through a communicating dedicated channel, and an MS forward link channel receiving device for interpreting a received message including information about the quasi-orthogonal codes, and a quasi-orthogonal code assigning method. Since Walsh codes are the predominantly used orthogonal codes for channelization, the term "Walsh codes" will be used instead of orthogonal codes in the following description. The present invention, however, is not limited to Walsh codes.

The generation of a general channel assignment message and a channel assigning procedure on a dedicated channel, in particular a forward link channel, according to an embodiment of the present invention will be described with reference to the attached drawings. Thus, in this embodiment of the present invention, the transmitting device is a BS forward link transmitter and the receiving device is an MS forward link receiver.

Figure 1:
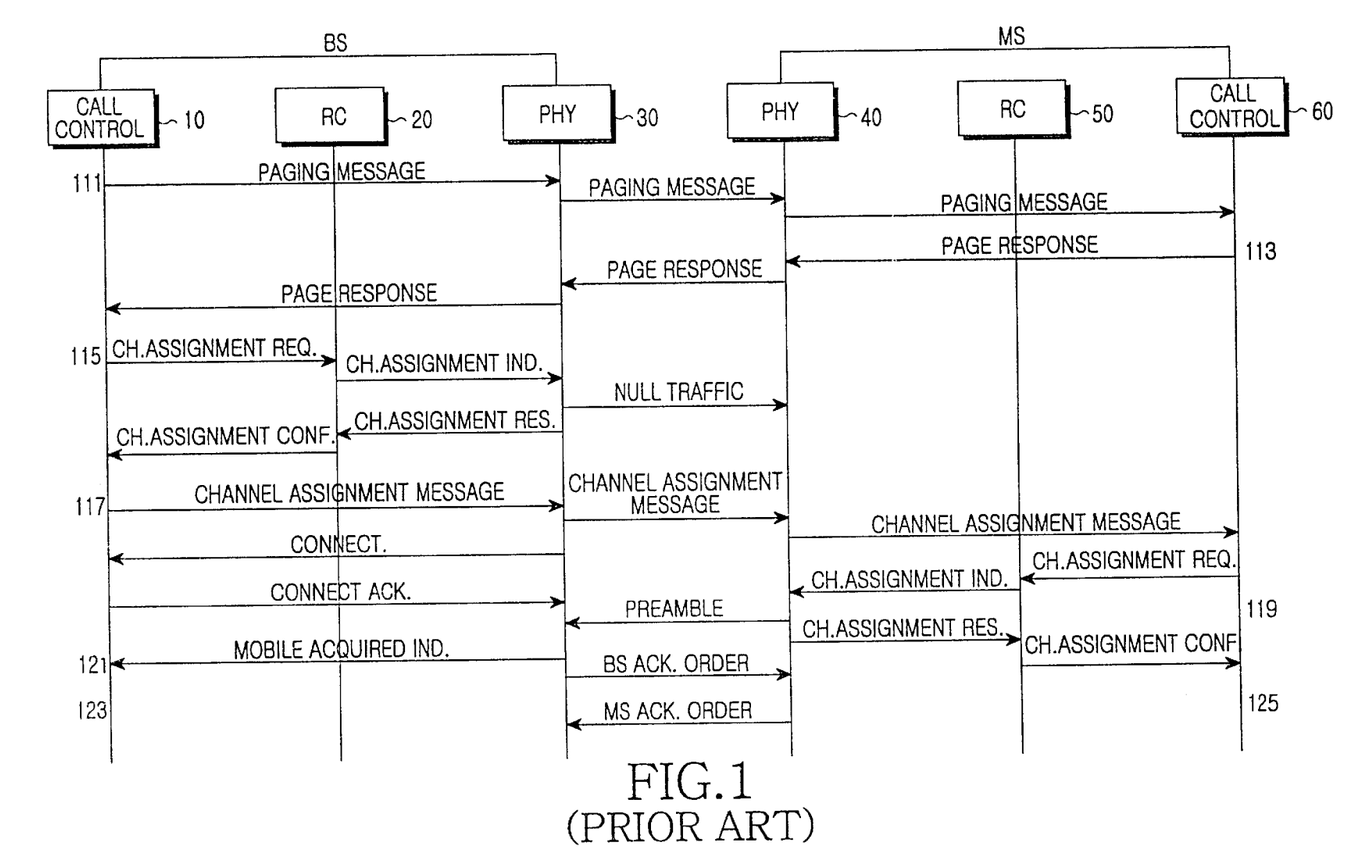
FIG. 1 illustrates a channel assignment procedure within and between a BS and an MS in a conventional CDMA communication system.

FIG. 1 illustrates a prior art procedure of generating a channel assignment message and assigning a dedicated channel on a paging channel between a BS and an MS when the BS requests for a call set-up in a CDMA communication system.

Figure 2:
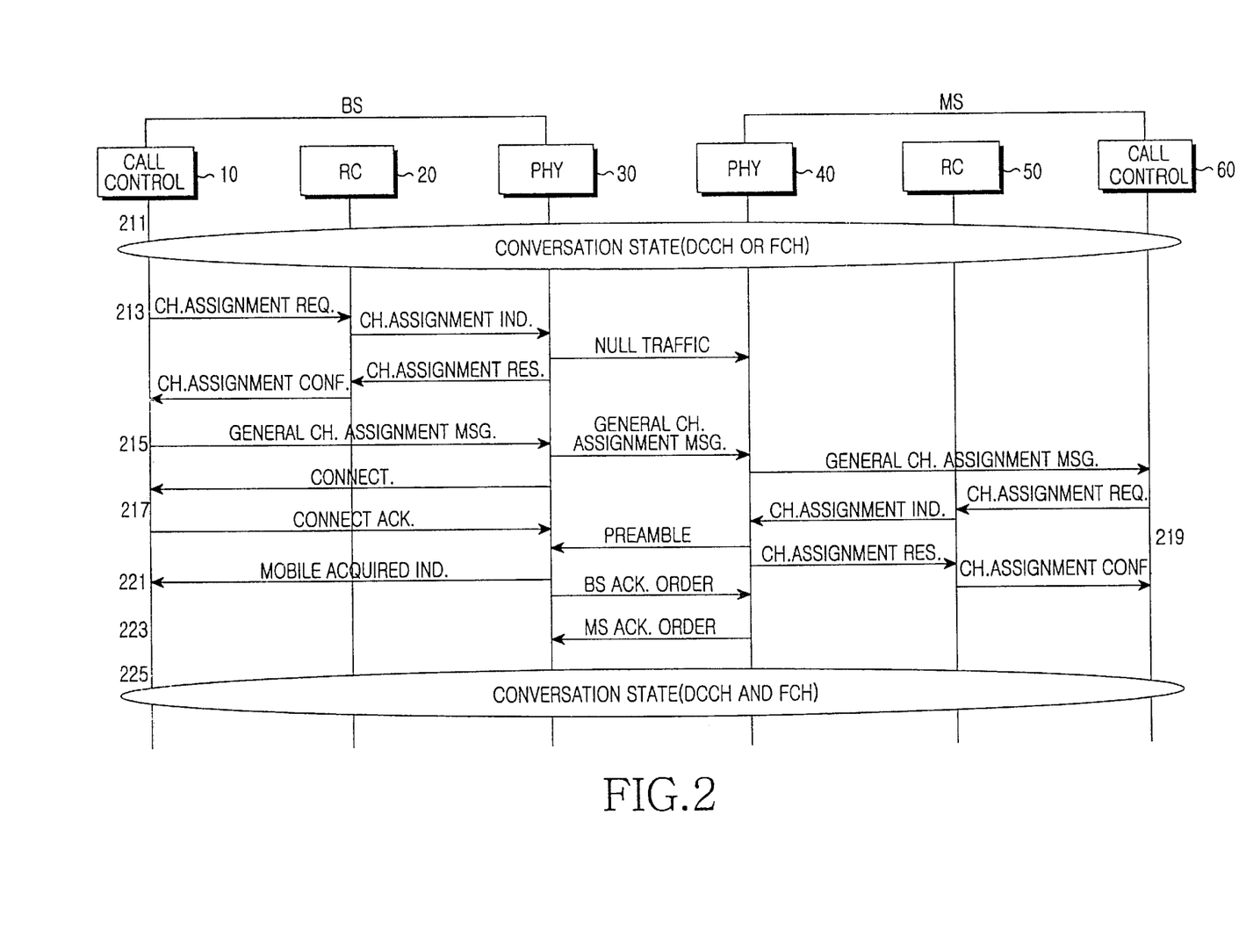
FIG. 2 illustrates a procedure for generating a general channel assignment message and assigning a dedicated control channel or fundamental channel on another dedicated channel in current use between a BS and an MS when the BS requests for a call set-up in a CDMA communication system in accordance with an embodiment of the present invention.
Figure 3:
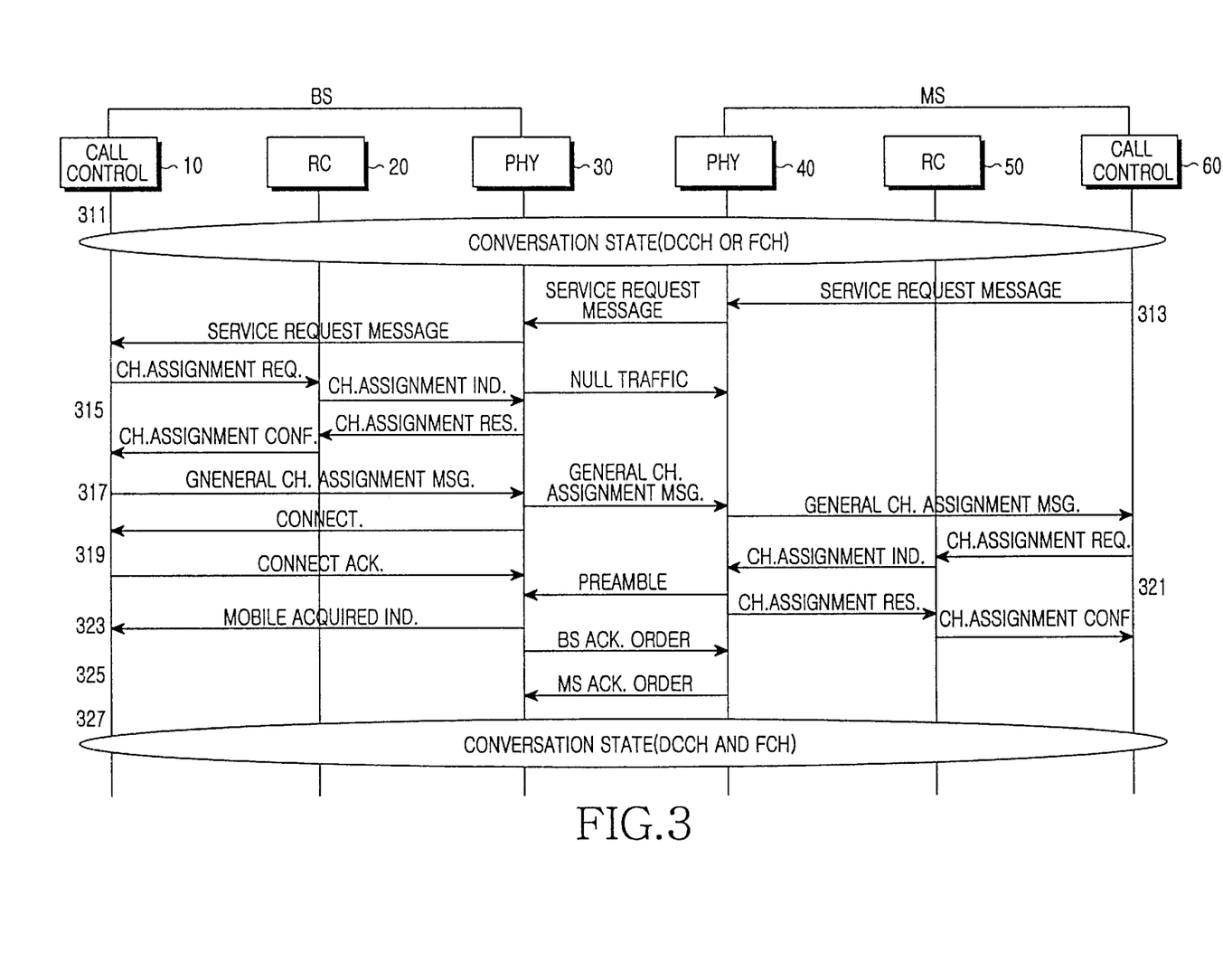
FIG. 3 illustrates a procedure for generating a general channel assignment message and assigning a dedicated control channel or fundamental channel on another dedicated channel in current use between a BS and an MS when the MS requests a call set-up in a CDMA communication system in accordance with an embodiment of the present invention.

FIG. 2 illustrates a procedure for generating a general channel assignment message and assigning a dedicated control channel or fundamental channel on another dedicated channel in current use between a BS and an MS, when the BS requests a call set-up in a CDMA communication system according to an embodiment of the present invention. FIG. 3 illustrates a channel assigning procedure in the CDMA communication system according to the embodiment of the present invention, in which when the MS requests a call set-up, the BS generates a general channel assignment message for transmission to the MS, and the MS assigns a dedicated control channel or a fundamental channel according to the general channel assignment message. By performing the procedures shown in FIGS. 2 and 3, the BS and the MS can provide a voice service and a packet data service using the fundamental channel and the dedicated control channel simultaneously.

Referring to FIGS. 2 and 3, a call control block 10 in the BS transmitter provides overall control for call set-up and call release for the BS. A resource controller (RC) 20 has the physical and logical resources associated with call set-up in the BS, and a physical channel block (PHY) 30 subjects the actual data for transmission to channel encoding, spreading, and modulation.

In the MS receiver, a PHY 40 demodulates, despreads, and decodes received data, an RC 50 has the physical and logical resources associated with call set-up in the MS, and a call control block 60 corresponds to the call control block 10 of the BS and controls call set-up.

While the description is conducted on the assumption that the BS transmits data and the MS receives data, the PHYs 30 and 40 each have a channel receiver and a channel transmitter. Therefore, when the MS transmits data, the PHY 40 performs channel encoding, spreading, and modulation. When the BS receives data, the PHY 30 performs demodulation, despreading, and channel decoding.

A procedure for assigning a dedicated channel on a channel in current use in the BS will be described referring to FIG. 2.

A conversation state is set in step 211. In the conversation state, a dedicated channel is established using a paging channel and the BS communicates with the MS on the established dedicated channel. This dedicated channel can be a fundamental channel or a dedicated control channel. When the BS or the MS requests for assignment of another dedicated channel while in the conversation state, the BS generates a dedicated channel assignment message and transmits it to the MS, using the following procedure.

Upon receipt of the request for channel assignment, the call control block 10 checks the states of available Walsh codes and quasi-orthogonal codes and the state of physical channels in the RC 20, in step 213. If it is determined that there are available physical resources in the RC 20, the call control block 10 sends the physical resources of the RC 20 to the corresponding PHY 30. Upon receipt of the physical resources from the RC 20, the PHY 30 assigns a channel based on the physical resources and responds to the channel assignment, and the call control block 10 receives information about the assigned channel from the RC 20. In step 215, the call control block 10 generates a general channel assignment message based on information received from the RC 20 and sends it to the PHY 30. Then, the PHY 30 transmits the general channel assignment message on the dedicated channel already established between the BS and the MS. If the established channel presently in the conversation state is a fundamental channel, the channel assignment message may be used to assign a dedicated control channel, and vice versa.

A channel receiver currently operated in the PHY 40 of the MS receives the general channel assignment message from the PHY 30 and transmits it to the call control block 60. The call control block 60 transmits channel information included in the general channel assignment message to the RC 50 and the RC 50 commands the PHY 40 to assign a corresponding channel. Then, the PHY 40 assigns the corresponding physical channel.

In step 223, if the BS confirms an establishing link between the BS and the MS, it sends a BS acknowledgment (Ack) order to the MS. Then, the MS sends an MS Ack order. Thus, a bi-directional link is completely established. Consequently, the BS and the MS enter a conversation state for transmitting/receiving voice or packet data using both the dedicated control channel and the fundamental channel simultaneously.

FIG. 3 illustrates a channel assignment procedure in the BS when the MS requests for channel assignment from the BS. The MS is assumed to be in conversation with the BS on a dedicated control channel established between the BS and the MS.

Referring to FIG. 3, if the MS needs to transmit voice data in a conversation state using the established dedicated control channel in step 311, the MS transmits a service request message to the BS, requesting the assignment of a fundamental channel in step 313. In step 315, the BS checks information about available channels in the same manner as in step 213, generates a general channel assignment message, and transmits the general channel assignment message to the MS. The subsequent steps of establishing the fundamental channel between the BS and the MS are performed as in the procedure of FIG. 2.

In the case that the dedicated channel established between the BS and the MS is a fundamental channel, if the MS needs to transmit packet data in the conversation state using the fundamental channel in step 311, the MS transmits a service request message to the BS, requesting the assignment of the fundamental channel in step 313. In step 315, the BS checks information about available channels in the same manner as in step 213, generates a general channel assignment message, and transmits the general channel assignment message to the MS. The subsequent steps of establishing the fundamental channel between the BS and the MS are performed as in the procedure of FIG. 2.

Figure 4:
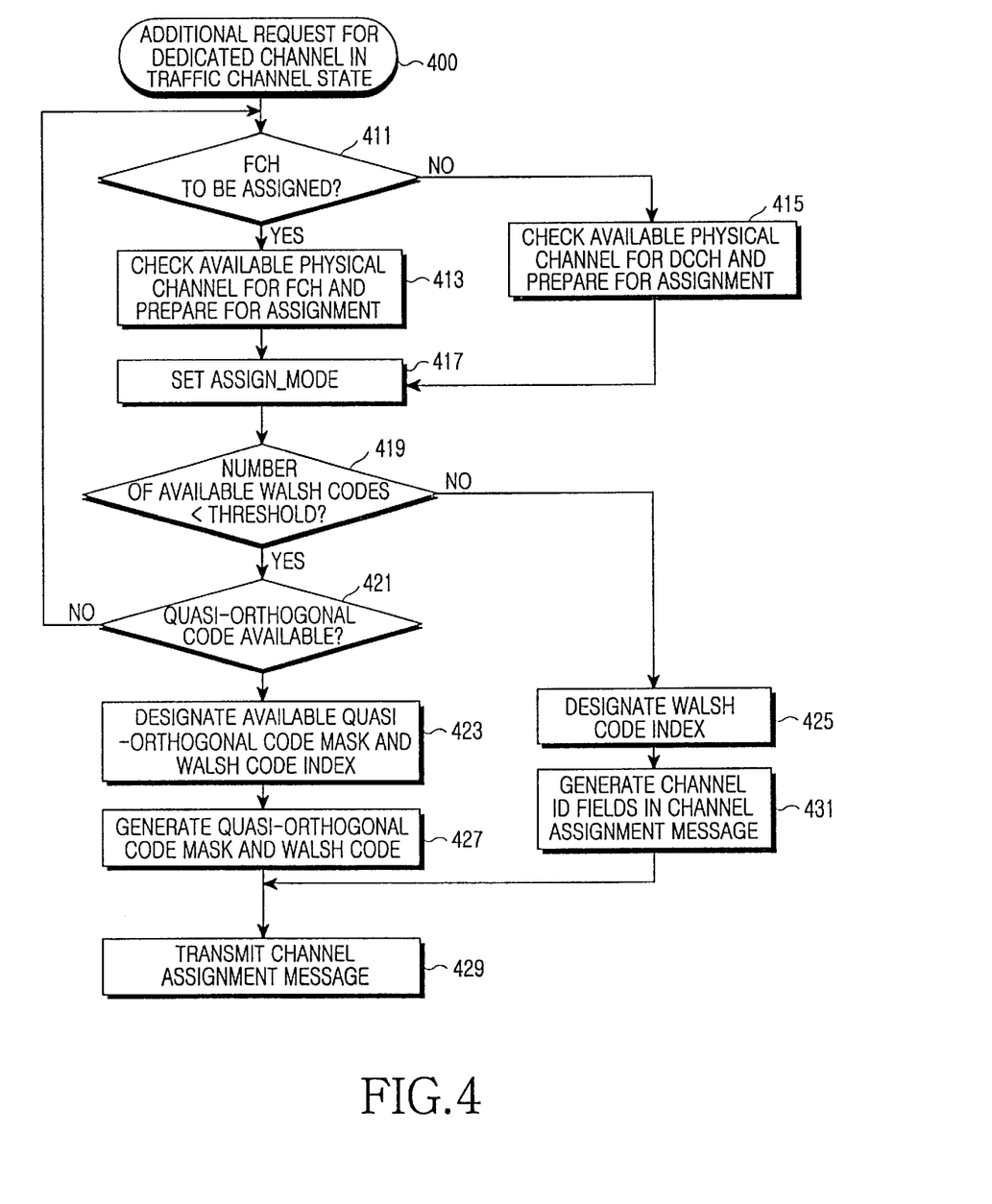
FIG. 4 is a flowchart depicting a quasi-orthogonal code and Walsh code assigning procedure in the BS of the CDMA communication system where quasi-orthogonal codes provide channelization between a forward dedicated control channel and a fundamental channel in accordance with an embodiment of the present invention.
Figure 5:
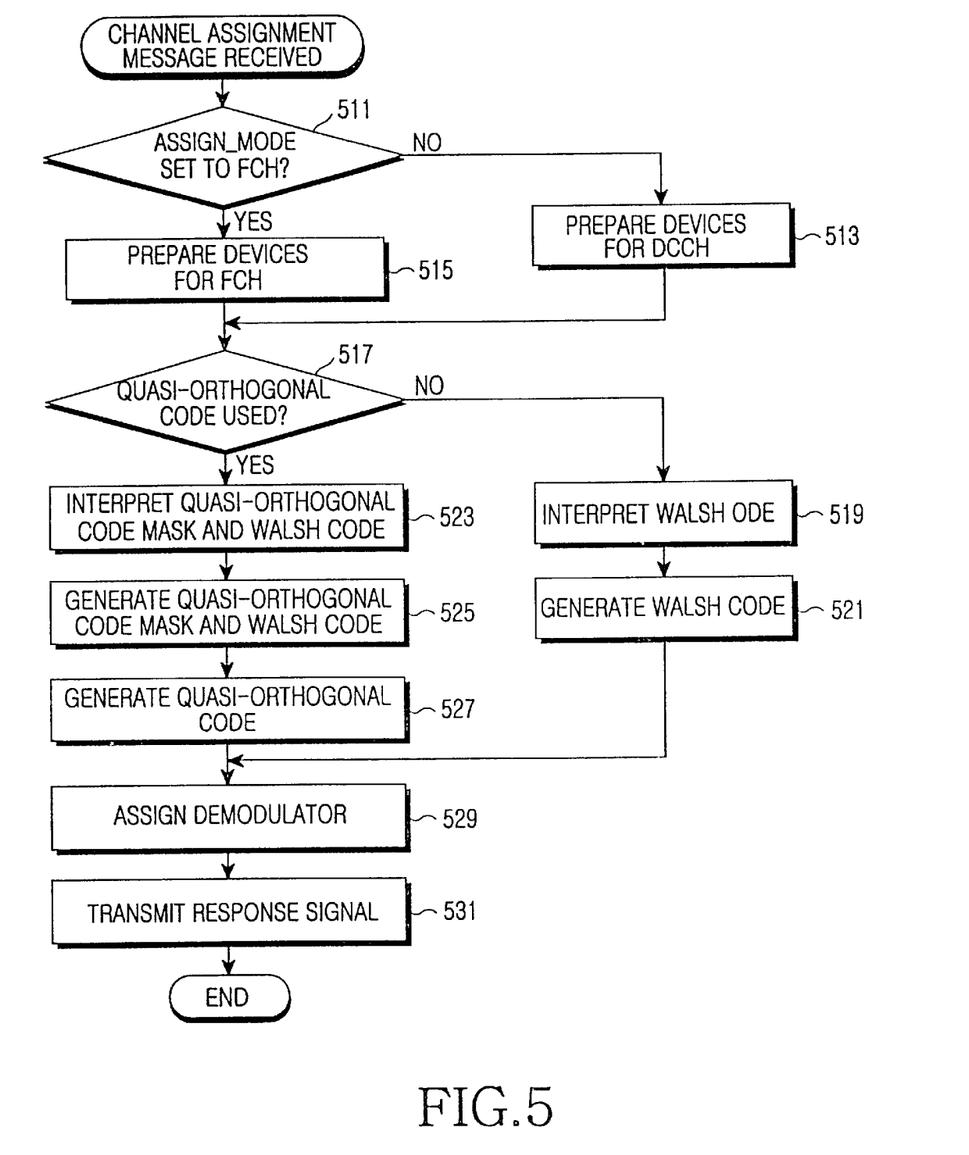
FIG. 5 is a flowchart depicting a quasi-orthogonal code and Walsh code demodulating procedure in the MS of the CDMA communication system where quasi-orthogonal codes provide channelization between a forward dedicated control channel and a fundamental channel in accordance with an embodiment of the present invention.

Steps 213 and 219 of FIG. 2 are performed in the procedures of FIGS. 4 and 5, respectively.

Before describing the flowcharts as shown in FIGS. 4 and 5, the message fields shown in FIGS. 8, 9, and 10 will be described for better understanding of an embodiment of the present invention.

Figure 8:
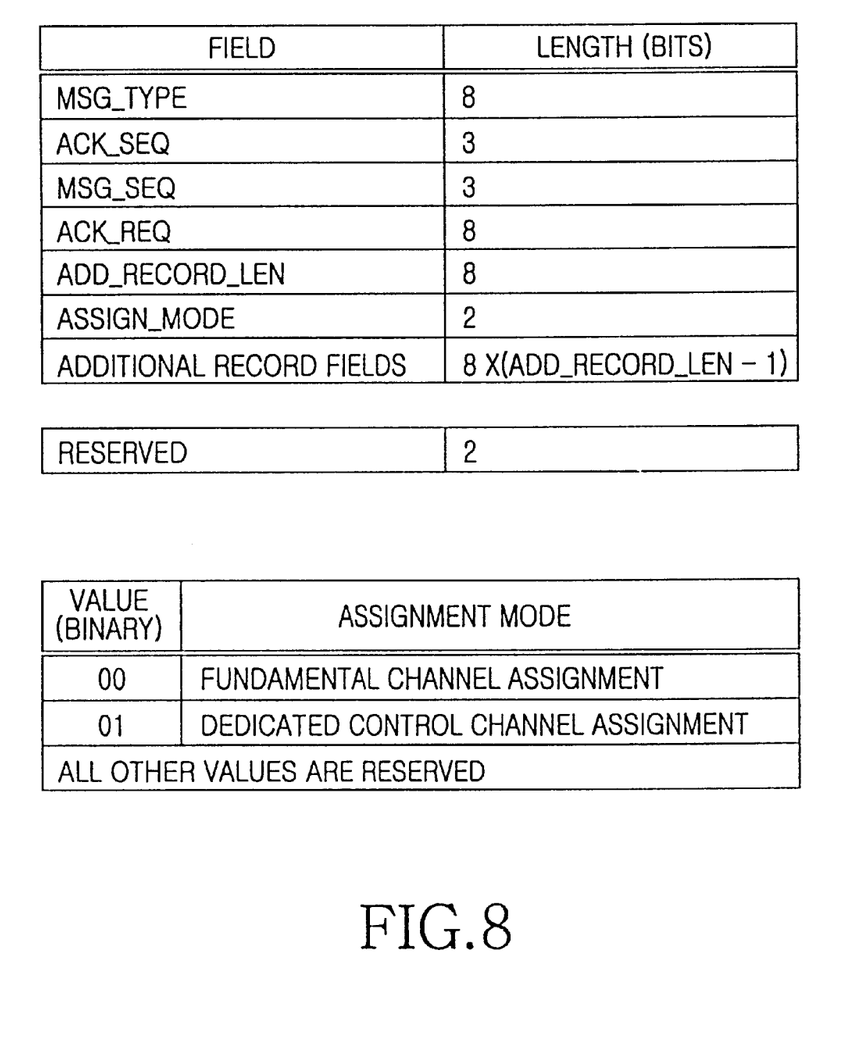
FIG. 8 illustrates message fields of a channel assignment message commonly used to assign a dedicated control channel or a fundamental channel on another dedicated channel in current use in the CDMA communication system in accordance with an embodiment of the present invention.

FIG. 8 illustrates an example of message fields in a channel assignment message, commonly used to assign a dedicated control channel or a fundamental channel on another dedicated channel in current use in a CDMA communication system; FIG. 9 illustrates message fields added to the message structure of FIG. 8 when a channel assignment message requesting assignment of a fundamental channel on another dedicated channel in current use has the "ASSIGN_MODE" set to "00"; and FIG. 10 illustrates message fields added to the message structure of FIG. 8 when a channel assignment message requesting assignment of a dedicated control channel on another dedicated channel in current use has the "ASSIGN_MODE" set to "01". The messages as illustrated in FIGS. 8, 9, and 10 are used in a dedicated control or fundamental channel assignment procedure of FIGS. 2 and 3.

Referring to FIG. 8, the message fields of the general channel assignment message includes general fields transmitted on a channel in current use and common fields of a channel assignment message in the IS-95 communication system.

The message fields in the message format of FIG. 8 will be briefly described.

MSG_TYPE: message type.

ACK_SEQ: the acknowledgment sequence number of a message received from the other party.

MSG_SEQ: the sequence number of a message to be transmitted.

ACK_REQ: acknowledgment required indicator indicating whether a message requires acknowledgment.

Fields used to assign a channel on a paging channel, that is, ADDR_TYPE, ADDR_LEN, and ADDRESS are unnecessary because a traffic channel is a dedicated channel. The above fields are common to most messages.

ADD_RECORD_LEN is a field which indicates the length of fields added to a message and defined by ASSIGN_MODE.

ENCRYPT_MODE is a field indicating encryption of user information transmitted on a dedicated control channel or a fundamental channel.

ASSIGN_MODE allows various channels to be assigned with one message. A fundamental channel, a dedicated control channel, and both channels can be assigned by setting the field to an intended value. A channel type assigned to an MS varies with the value of ASSIGN_MODE and different fields are added according to the channel type.

Additional record fields provide additional channel information determined by ASSIGN_MODE and the length of the additional record fields is indicated by ADD_RECORD_LENGTH so that the MS can know the entire message length.

RESERVED is a field reserved for future use.

ASSIGN_MODE indicates a channel type assigned to the MS on a channel for current use. If this field is set to '00', message fields shown in FIG. 9 are added to the message structure of FIG. 8 to assign a fundamental channel.

Figure 9:
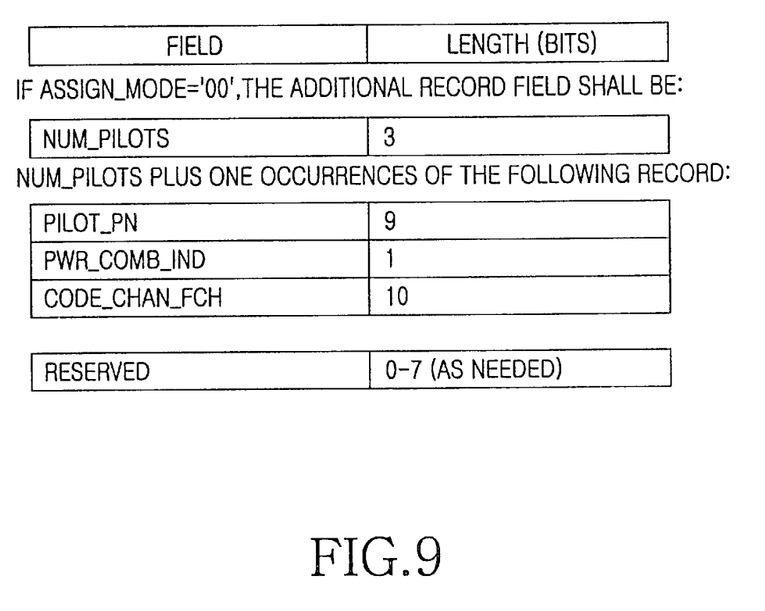
FIG. 9 illustrates additional record fields included in a channel assignment message requesting the assignment of a fundamental channel on another dedicated channel in current use when the "ASSIGN_MODE" of FIG. 8 is "00" in accordance with an embodiment of the present invention.
Figure 10:
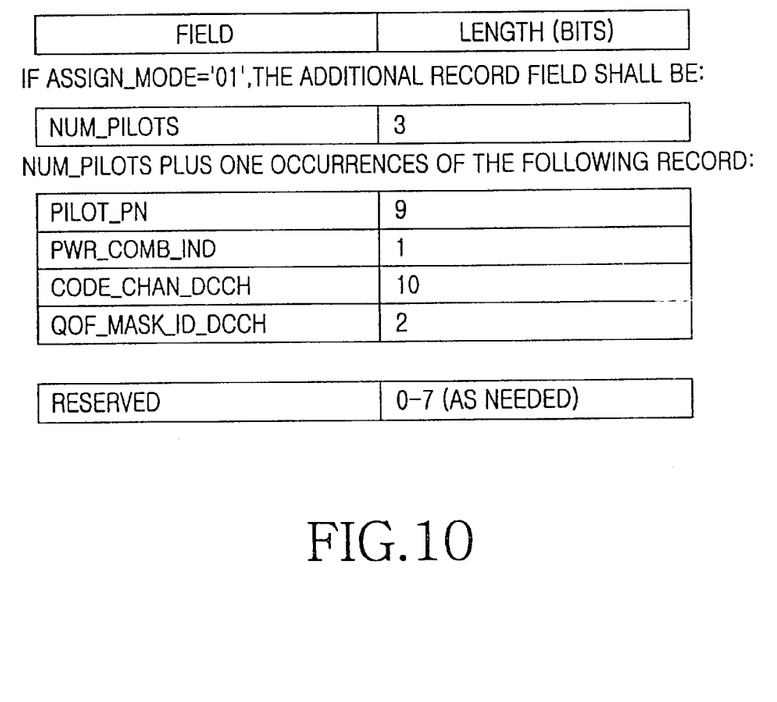
FIG. 10 illustrates additional record fields included in a channel assignment message requesting the assignment of a dedicated control channel on another dedicated channel in current use when the "ASSIGN_MODE" of FIG. 8 is "01" in accordance with the present invention.

Referring now to FIG. 9, NUM_PILOTS sets the number of pilots in the active sets to be managed by the MS. PILOT_PN is the pilot PN offset index of a corresponding BS and set in units of 64 PN chips.

PWR_COMB_IND is set to '1' or '0'. If the forward dedicated channel associated with this pilot will carry the same closed-loop power control subchannel bits as that of the previous pilot in this message, the base station shall set this field to '0'. For the first occurrence of this record in the message, the base station shall set this field to '0'.

CODE_CHAN_FCH is the index of a code to be used by a BS using the recorded pilot, indicating the Walsh code of a fundamental channel.

CODE_CHAN_DCCH is the index of a code to be used by a BS using the recorded pilot, indicating the Walsh code of a dedicated control channel.

RESERVED is a field used to adjust the length of the additional record field in byte units.

ASSIGN_MODE indicates the type of a channel assigned to an MS on a channel currently occupied as stated before. If this field is set to '01', message fields shown in FIG. 10 are added to the message structure of FIG. 8 to assign a dedicated control channel.

The message fields that are used to assign a fundamental channel are also used in assigning the dedicated control channel. When a channel is assigned, an additional field QOF_MASK_ID is set to a value indicating an intended quasi-orthogonal code mask so that an quasi-orthogonal code can be used. If QOF_MASK_ID is '00', an MS does not use a quasi-orthogonal code. If the field has any other value, a predetermined quasi-orthogonal mask is used according to the MASK ID.

A message with the message format shown in FIGS. 8 and 9 is used to assign a fundamental channel and is newly defined in the next-generation mobile communication system to assign a dedicated control channel. The dedicated control channel has different physical characteristics than a fundamental channel defined in the IS-95 system. The dedicated control channel supports a discontinue transmission mode (DTX) in which data is transmitted only if the data to be transmitted is generated.

Figure 6:
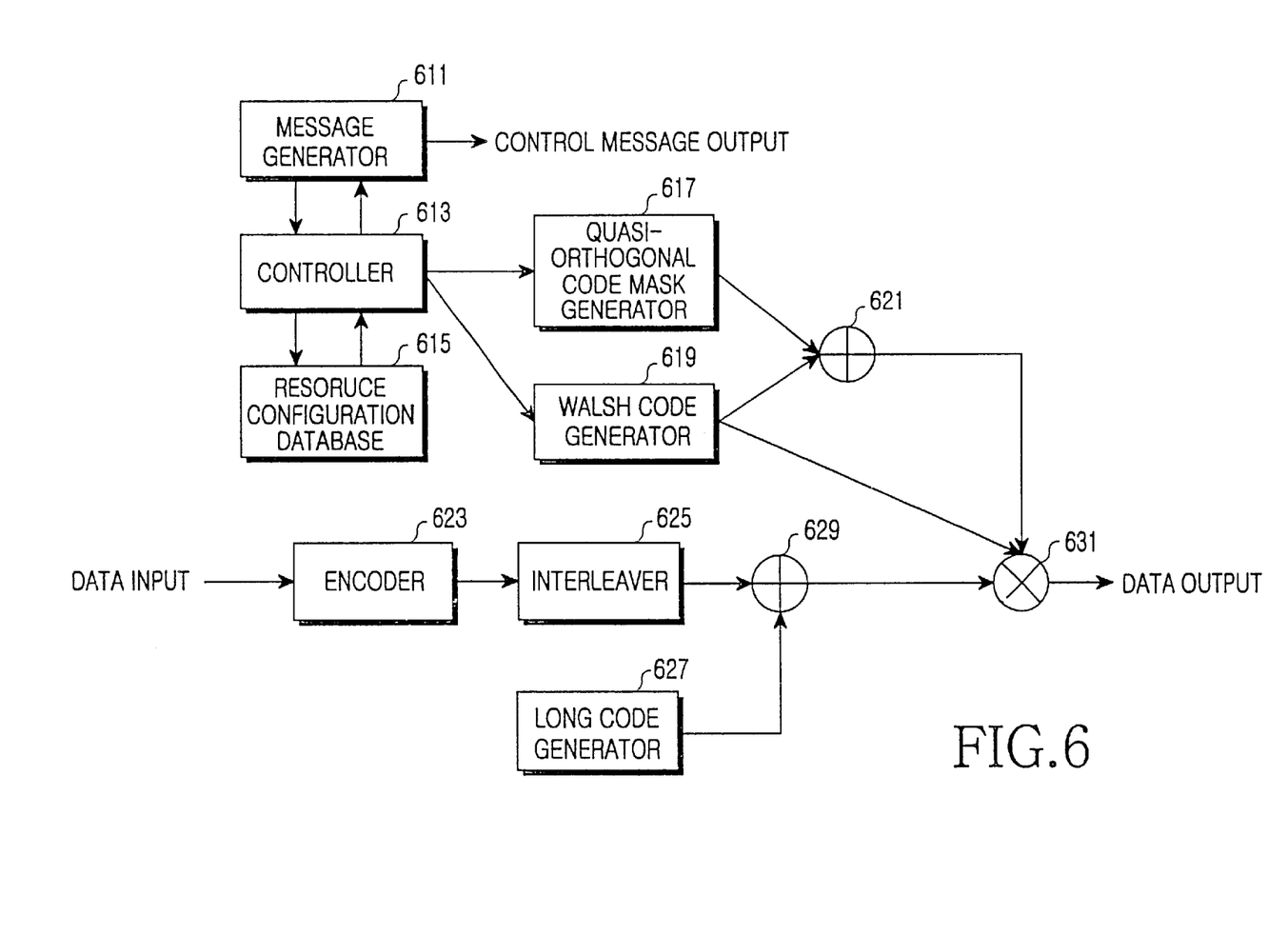
FIG. 6 is a block diagram of a transmitting device for generating quasi-orthogonal codes in the CDMA communication system where quasi-orthogonal codes provide channelization between a forward dedicated control channel and a fundamental channel in accordance with an embodiment of the present invention.
Figure 7:
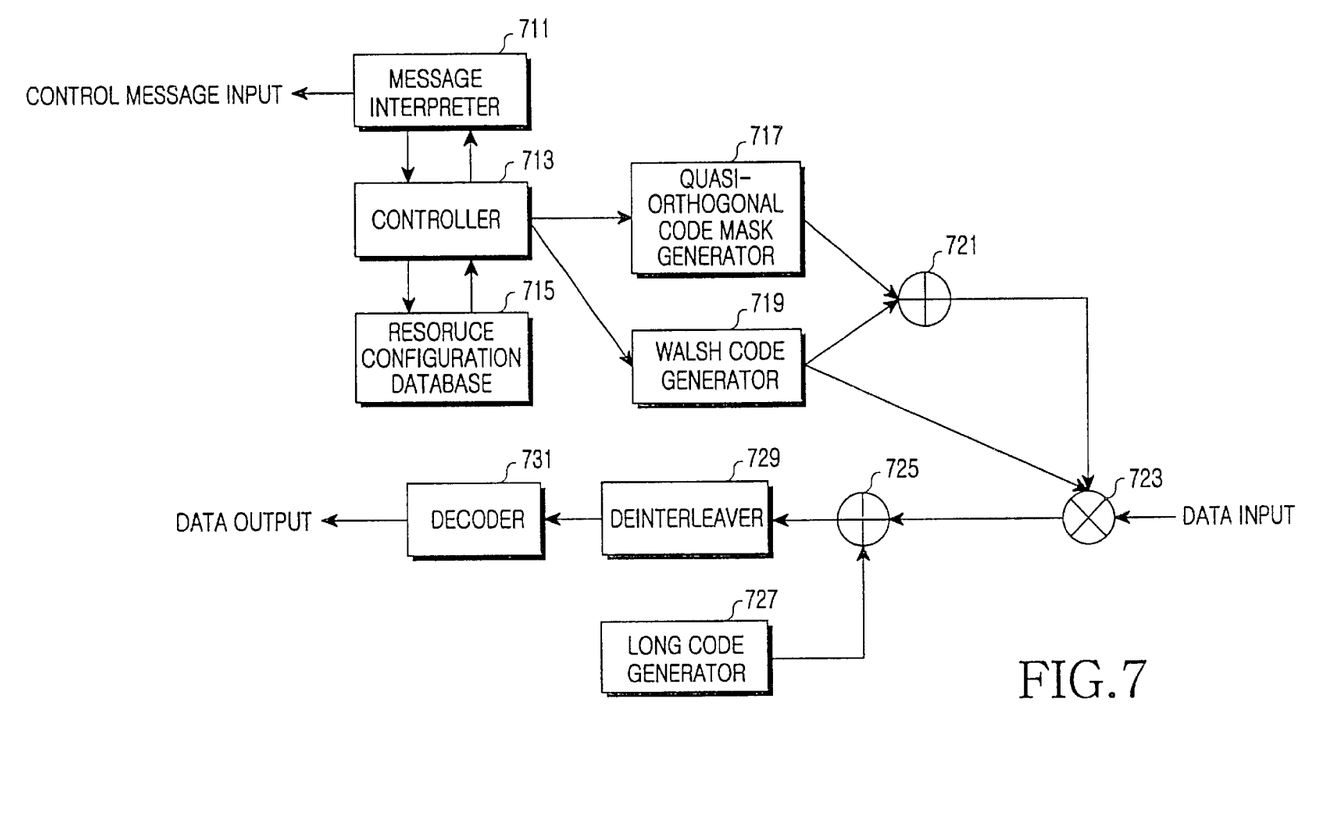
FIG. 7 is a block diagram of a receiving device for demodulating quasi-orthogonal codes in the CDMA communication system where quasi-orthogonal codes provide channelization between a forward dedicated control channel and a fundamental channel in accordance with an embodiment of the present invention.

Referring now to FIG. 6, FIG. 6 is a block diagram of a BS transmitting device which can generate a quasi-orthogonal code in a CDMA communication system where quasi-orthogonal codes provide channelization on a forward link, and FIG. 7 is a block diagram of an MS receiving device which can demodulate a channel signal spread by a quasi-orthogonal code in a CDMA communication system.

Steps 213 and 315 of generating fields of a control message to assign a channel and steps 219 and 321 of interpreting and generating a channel ID in FIGS. 2 and 3 are performed by the components shown in FIGS. 6 and 7.

FIG. 6 is a block diagram of the BS transmitting device having a spectrum spreader using Walsh codes and quasi-orthogonal codes in the mobile communication system, to independently spread a channel signal in accordance with an embodiment of the present invention.

A message generator 611 generates various messages under the control of a controller 613 during a call set-up. The messages are transmitted through a paging channel transmitter (not shown) or on a traffic channel through a dedicated control channel transmitter (not shown). Here, the paging channel transmitter transmits various messages and data generated in the absence of a dedicated channel to an MS. The dedicated control channel transmitter transmits various messages and data for controlling a dedicated traffic channel to the MS.

The controller 613 provides overall control to the BS transmitting device. The controller 613 is a module which determines which code, between a Walsh code or a quasi-orthogonal code, is to be used for channelization during a call set-up in an embodiment of the present invention. If a quasi-orthogonal code is used, the controller 613 selects quasi-orthogonal code information, and controls channel assignment and generation of a control message. A resource configuration database 615 includes physical and logical resources necessary for communication with a current MS or an MS waiting for communication. The resource configuration database 615 has the mask numbers of quasi-orthogonal codes and the indexes of Walsh codes to assign the Walsh codes or the quasi-orthogonal codes to a dedicated control channel assigned on a traffic channel according to an embodiment of the present invention. The resource configuration database 615 also stores information about whether quasi-orthogonal code masks and the Walsh code indexes are available or not. Resources associated with an embodiment of the present invention among the resources managed in the resource configuration database 615 are listed below in Tables 1a and 1b.

TABLE 1a

| QOF mask ID | QOF mask |
| --- | --- |
| 00 | NONE |
| 01 | f1 |
| 10 | f2 |
| 11 | f3 |

TABLE 1b

Resource configuration database

| Walsh code | quasi-orthogonal code using QOF mask f1 | quasi-orthogonal code using QOF mask f2 | quasi-orthogonal code using QOF mask f3 |
| --- | --- | --- | --- |
| #0 | f1 + #0 | f2 + #0 | f3 + #0 |
| #1 | f1 + #1 | f2 + #1 | f3 + #1 |
| #2 | f1 + #2 | f2 + #2 | f3 + #2 |
| #3 | f1 + #3 | f2 + #3 | f3 + #3 |
| — | — | — | — |
| — | — | — | — |
| #n | f1 + #n | f2 + #n | f3 + #n |

A quasi-orthogonal code mask generator 617 generates a quasi-orthogonal code g mask corresponding to a quasi-orthogonal code mask number received from the controller generator 619 generates a Walsh code corresponding to a Walsh code 621 adds the quasi-orthogonal code mask received from the quasi-orthogonal code mask generator 617 to the Walsh code received from the Walsh code generator 619 to thereby produce a quasi-orthogonal code.

A channel encoder 623 is a typical channel encoder for detecting errors from a communication channel and correcting the errors. An interleaver 625 randomizes burst errors. A long code generator 627 generates a long code using a long code mask. An adder 629 adds the outputs of the interleaver 625 and the long code generator 627, for scrambling. The scrambled information can be received only in a receiver using the same long code mask. A multiplier 631 multiplies the output of the adder 629 by the quasi-orthogonal code received from the adder 621 or the Walsh code received from the Walsh code generator 619 to provide channelization Referring to FIG. 6, upon generation of a message for channel assignment, the controller 613 receives information about the states of current stored resources from the resource configuration database 615, determines whether the number of available Walsh codes is greater than a threshold value, and controls generation of a Walsh code or a quasi-orthogonal code. If the number of available Walsh codes is greater than the threshold value, that is, at least one available Walsh code exists, the controller 613 selects one of the at least one available Walsh code index from the resource configuration database 615, notifies the Walsh code generator 619 of the selected Walsh code index, and updates information about the selected Walsh code index to indicate that it is in use. Then, the Walsh code generator 619 generates a Walsh code corresponding to the selected index and sends the Walsh code not to the adder 621 but to the multiplier 631. The quasi-orthogonal code mask generator 617 does not generate a quasi-orthogonal code mask because it receives no information. Therefore, the adder 621 does not generate a quasi-orthogonal code.

On the other hand, if the number of the available Walsh codes is less than the threshold value, that is, no available Walsh codes exist, the controller 613 checks the states of quasi-orthogonal code mask numbers and corresponding Walsh code indexes in the resource configuration database 615, selects an available quasi-orthogonal code mask number and Walsh code index, notifies the quasi-orthogonal code mask generator 617 and the Walsh code generator 619 of the quasi-orthogonal code mask number and the Walsh code index, respectively, and updates information about the selected Walsh code index to indicate that it is in use. Then, the quasi-orthogonal code mask generator 617 generates a quasi-orthogonal code mask corresponding to the quasi-orthogonal code mask number. The Walsh code generator 619 generates a Walsh code corresponding to the Walsh code index and feeds the Walsh code not to the multiplier 631 but to the adder 621. The adder 621 produces a quasi-orthogonal code by adding the quasi-orthogonal code mask received from the quasi-orthogonal code mask generator 617 to the Walsh code received from the Walsh code generator 619, and outputs the quasi-orthogonal code to the multiplier 631. The multiplier 631 multiplies the modified data input by the quasi-orthogonal code, thus distinguishing a channel.

To provide channelization using quasi-orthogonal codes, the controller 613 checks quasi-orthogonal code masks and Walsh codes remaining in the resource configuration database 615, selects an available quasi-orthogonal code mask number and Walsh code index, notifies the quasi-orthogonal code mask generator 617 and the Walsh code generator 619 of the selection, and controls the resource configuration database 615 to update information about the states of the selected quasi-orthogonal code mask number and Walsh code index. Then, the quasi-orthogonal code mask generator 617 and the Walsh code generator 619 generate a corresponding quasi-orthogonal code mask and Walsh code, and output them to the adder 621. In the case that a quasi-orthogonal code is not used, a channel ID is generated using only the Walsh code. That is, the controller 613 generates a Walsh code index without designating a quasi-orthogonal code mask number. Then, the quasi-orthogonal code mask generator 617 does not generate a quasi-orthogonal code mask, and only a Walsh code generated in the Walsh code generator 619 is applied to the multiplier 631 through the adder 621.

If a quasi-orthogonal code is to be used, the adder 621 generates the quasi-orthogonal code with the outputs of the quasi-orthogonal code mask generator 617 and the Walsh code generator 619. If no quasi-orthogonal code is to be used, the adder 621 generates an orthogonal code for channel spreading, using only the output of the Walsh code generator 619. The controller 613 notifies a message generator 611 of the quasi-orthogonal code mask or the Walsh code index to be used and sets the field QOF_MASK_ID_DCCH or CODE_CHAN_DCCH in a channel assignment message to a corresponding value, and sends the channel assignment message to an MS.

FIG. 7 is a block diagram of an MS receiving device according to an embodiment of the present invention.

In FIG. 7, a control message received in an MS through a reception antenna is applied to a message interpreter 711 through a channel receiver currently operated. The channel receiver in current use can be a fundamental channel receiver or a dedicated control channel receiver. The message interpreter 711 interprets channel ID information from the fields QOF_MASK_ID_DCCH and CODE_CHAN_DCCH of the channel assignment message, and sends the channel ID information to the controller 713. The controller 713 sends the channel ID information to the quasi-orthogonal code mask generator 717 and the Walsh code generator 719 and updates the data of a resource configuration database 715. If a quasi-orthogonal code is used, the quasi-orthogonal code mask generator 717 and the Walsh code generator 719 generate a quasi-orthogonal code mask and a Walsh code, respectively. An adder 721 generates a quasi-orthogonal code by adding the quasi-orthogonal code mask to the Walsh code. In this case, the Walsh code is not applied to a multiplier 723. If a Walsh code is used, the output of the Walsh code generator 719 is applied to the multiplier 723, and the adder 721 does not generate a quasi-orthogonal code. The resource configuration database 715 is used mainly to store information about resources assigned by the BS. If it turns out in a message interpretation that a quasi-orthogonal code is not used, the channel ID is generated using the Walsh code only.

Upon receipt of data or a message on the forward channel, the received signal is applied to the multiplier 723. The multiplier 723 detects a signal of a corresponding channel by multiplying the received signal by the quasi-orthogonal code or the Walsh code. An adder 725 adds the output of the multiplier 723 to a long code, for descrambling. Here, a long code generator 727 generates the long code using a selected long code mask. A deinterleaver 729 deinterleaves the output of the adder 725 and a channel decoder 731 channel-decodes the deinterleaved signal.

A channel assigning procedure will now be described which uses a quasi-orthogonal code or a Walsh code to assign a channel on a traffic channel in the BS and the MS of a CDMA communication system. FIGS. 4 and 5 are flowcharts depicting a channel assigning procedure using a Walsh code or a quasi-orthogonal code to distinguish between a forward dedicated control channel and a fundamental channel in the BS transmitting device and the MS receiving device, respectively.

Referring to FIG. 4, upon request for additional assignment of a fundamental channel on a dedicated control channel in the state where a dedicated channel has been established for conversation at step 400, the controller 613 determines whether the channel to be assigned is a fundamental channel or a dedicated control channel in step 411. If the fundamental channel is to be assigned, the controller 613 determines whether available physical channels exist in the resource configuration database 615 and selects a physical channel having the characteristics of the fundamental channel to be assigned, in step 413. If the dedicated control channel is to be assigned, the controller 613 determines whether available physical channels exist in the resource configuration database 615 and selects a physical channel having the characteristics of the dedicated control channel to be assigned, in step 415. In step 417, the controller 613 sets the field ASSIGN_MODE shown in FIG. 8 to an intended value according to the type of the requested physical channel. When the suitable channel is ready, a forward channel ID distinguishing procedure is performed.

Then, the controller 613 compares the number of Walsh codes in current use with a threshold value to distinguish a forward traffic channel in step 419. If the number of Walsh codes in current use is greater than a certain value, which is shown by the fact that the number of available Walsh codes is less than the threshold value in step 421, the controller 613 determines whether a quasi-orthogonal code can be used by referring to a database stored in the resource configuration database 615 and whether there is an available quasi-orthogonal code mask and Walsh code index in step 421. If a quasi-orthogonal code can be used, the controller 613 designates an available quasi-orthogonal code mask number and Walsh code index in the resource configuration database 615, in step 423. The controller 613 sets the channel ID fields QOF_MASK_ID_DCCH and CODE_CHAN_DCCH of the channel assignment message using the Walsh code index to the available quasi-orthogonal code mask number and the Walsh code number, respectively, in step 427. The control message has quasi-orthogonal code assignment information which includes the quasi-orthogonal code mask number and the Walsh code index, and is transmitted on a paging channel or a dedicated control channel. The controller 613 transmits the channel assignment message in step 429.

Meanwhile, the quasi-orthogonal code mask and Walsh code index designated by the controller 612 are applied to the input of the quasi-orthogonal code mask generator 617 and the Walsh code generator 619, respectively. The quasi-orthogonal code mask generator 617 and the Walsh code generator 619 generate a corresponding quasi-orthogonal code mask and Walsh code, respectively. The adder 621 adds the quasi-orthogonal code mask and the Walsh code to thereby generate a quasi-orthogonal code. The quasi-orthogonal code is applied to the forward channel device and then the channel ID of a forward dedicated channel is completed.

If the number of the Walsh codes in current use is less than a certain value, that is, the number of available Walsh codes is greater than the threshold value in step 419, the controller 613 designates a Walsh code index only in step 425. The controller 613 sets the channel ID fields QOF_MASK_ID_DCCH and CODE_CHAN_DCCH of the channel assignment message using the Walsh code index to '00' and the Walsh code number, respectively, in step 431. The controller 613 transmits the channel assignment message in step 429.

The controller 613 applies the designated Walsh code index to the Walsh code generator 619 and the Walsh code generator 619 generates a Walsh code corresponding to the Walsh code index. In this case, the quasi-orthogonal code generator 617 does not generate a quasi-orthogonal code mask.

The threshold value indicates the number of Walsh codes which should be reserved in configuring a system and can be set to an optimal value. The reserved Walsh codes are used in case a high quality forward link channel is to be assigned, instead of quasi-orthogonal codes, which are inferior to the Walsh codes in orthogonality.

During the procedures illustrated in FIGS. 4 and 5, the BS can use a Walsh code in assigning a high priority channel, even in a situation where a quasi-orthogonal code is normally used.

Code assignment is based on channel priority, which is determined in the following ways: (1) use of quasi-orthogonal codes can be limited if data requiring high QoS (Quality of Service) is to be transmitted; (2) users are classified and a Walsh code is assigned to a user in a high class; and (3) a higher priority is given to a fundamental channel or a dedicated control channel on which important control information should be transmitted with less errors. The channel priority can be adjusted as needed.

FIG. 5 is a flowchart depicting a channel assigning procedure in the MS which receives the channel assignment message from the BS on a traffic channel, as described in FIG. 4.

Referring to FIG. 5, the MS, upon receipt of the channel assignment message from the BS, determines whether an additional channel to be assigned is a fundamental channel or a dedicated control channel by analyzing the field ASSIGN_MODE of the channel assignment message in step 511 and prepares a corresponding physical channel according to the result of the above determination in step 513 or step 515.

If the channel assignment message is a general channel assignment message, the controller 713 determines whether a quasi-orthogonal code mask has been used or not by analyzing the general channel assignment message in step 517. If the quasi-orthogonal code has been used, the controller 713 reads the quasi-orthogonal code mask number and a Walsh code index set in the general channel assignment message in step 523. Then, the controller 713 generates a quasi-orthogonal code mask corresponding to the quasi-orthogonal code mask number and a Walsh code corresponding to the Walsh code index in step 525 and generates the quasi-orthogonal code by mixing the quasi-orthogonal code mask with the Walsh code in step 527.

If it is determined that a quasi-orthogonal code has not been used in step 517, the controller 713 uses the Walsh code index only in step 519 and generates the Walsh code corresponding to the Walsh code index in step 521. Then, the controller 713 assigns a demodulator for an assigned forward link channel in step 529, and sends the BS a response message, notifying that it is ready for receiving the forward link channel in step 531. The response message can be transmitted on an access channel or a reverse dedicated control channel.

In accordance with an embodiment of the present invention as described above, a dedicated control channel or a fundamental channel requested by an MS in a conversation state using a fundamental channel or a dedicated control channel can be assigned on a traffic channel with the use of the above channel assignment procedures and messages. Therefore, the channel assignment increases the performance and capacity of the MS and is useful for CDMA 2000 service. Furthermore, channel assignment of a dedicated control channel using a quasi-orthogonal code contributes to the increase of channel capacity regardless of the limited number of Walsh codes in a CDMA mobile communication system. The capacity of a forward link using quasi-orthogonal codes can be increased by use of the procedures and the transmitting/receiving device according to an embodiment of the present invention.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A channel assigning method for a base station in a CDMA (Code Division Multiple Access) communication system, comprising the steps of:
    establishing a first dedicated channel and communicating with a mobile station on the established first dedicated channel;
    determining a mode of a second dedicated channel and a channel spreading code information for the second dedicated channel upon request for additional assignment of the second dedicated channel while in a conversation state;
    assigning the second dedicated channel;
    generating a channel assignment message including the determined channel assignment mode and channel spreading code information to assign the second dedicated control channel; and
    transmitting the channel assignment message to the mobile station on the first dedicated channel.

2. The channel assigning method of claim 1, wherein the channel spreading code information determination step further comprises:
    selecting an available Walsh code as the channel spreading code information if the number of Walsh codes in current use is less than a predetermined availability limit.

3. The channel assigning method of claim 1, wherein the channel spreading code information determination step further comprises:
    selecting an available quasi-orthogonal code mask and a Walsh code as the channel spreading code information if the number of Walsh codes in current use is greater than or equal to a predetermined availability limit.

4. The channel assigning method of claim 1, wherein the channel spreading code information determination step further comprises:
    selecting a Walsh code as the channel spreading code information when assigning a high priority dedicated channel.

5. The channel assigning method of claim 1, wherein a dedicated control channel assignment mode is set as the channel assignment mode when the first dedicated channel in current use is a fundamental channel.

6. The channel assigning method of any of claim 1, wherein a fundamental channel assignment mode is set as the channel assignment mode when the first dedicated channel in current use is a dedicated control channel.

7. A channel assigning method for a mobile station in a CDMA (Code Division Multiple Access) communication system, comprising the steps of:
    communicating with a base station on a first dedicated channel;
    receiving on the first dedicated channel a channel assignment message including a channel assignment mode for assigning a second dedicated channel and channel spreading code information;
    establishing the second dedicated channel in response to the channel assignment message; and
    notifying the base station of the channel establishment.

8. The channel assignment method of claim 7, wherein if the channel spreading code information included in the channel assignment message is a Walsh code, a Walsh code corresponding to a Walsh code index is generated and assigned to a dedicated channel corresponding to the channel assignment mode in the step of establishing the second dedicated channel.

9. The channel assigning method of claim 7, wherein if the channel spreading code information included in the channel assignment message is a quasi-orthogonal code mask and a Walsh code, a quasi-orthogonal code is generated by adding the quasi-orthogonal code mask to the Walsh code and assigned to a dedicated channel corresponding to the channel assignment mode in the step of establishing the second dedicated channel.

10. The channel assigning method of claim 7, wherein if the first dedicated channel in current use is a fundamental channel, the second dedicated channel is a dedicated control channel in the channel assignment mode of the channel assignment message.

11. The channel assigning method of claim 7, wherein if the first dedicated channel in current use is a dedicated control channel, the second dedicated channel is a fundamental channel in the channel assignment mode of the channel assignment message.

12. A channel assigning method in a CDMA (Code Division Multiple Access) communication system, comprising the steps of:
 establishing a first dedicated channel and communicating on the first dedicated channel between a base station and a mobile station;
 determining a mode of a second dedicated channel and channel spreading code information upon request for additional assignment of the second dedicated channel while in a conversation state;
 assigning the second dedicated channel;
 generating a channel assignment message including the determined channel assignment mode and channel spreading code information to assign the second dedicated control channel by the base station;
 transmitting the channel assignment message to the mobile station on the first dedicated channel by the base station;
 receiving the channel assignment message on the first dedicated channel by the mobile station;
 establishing the second dedicated channel in response to the channel assignment message and notifying the base station of channel establishment by the mobile station; and
 communicating between the base station and the mobile station on the first and second dedicated channels.

13. A channel assigning device for a base station in a CDMA (Code Division Multiple Access) communication system, comprising:
 at least first and second dedicated channel transmitters for transmitting a first dedicated channel in current use and a second dedicated channel set in an idle state, respectively;
 a resource configuration database for storing information about modes of dedicated channels, a resource state, and channel spreading code information; and
 a controller for determining a mode of a dedicated channel and a channel spreading code information for use in channel assignment from the resource configuration database, transmitting the determined information to the second channel transmitter, generating a channel assignment message including the channel spreading code information and a channel assignment mode indicated by the determined dedicated channel mode and channel spreading code information, and transmitting the channel assignment message on the first dedicated channel.

14. The channel assigning device of claim 13, wherein the first dedicated channel transmitter is a fundamental channel transmitter and the second dedicated channel transmitter is a dedicated control channel transmitter.

15. The channel assigning device of claim 13, wherein the first dedicated channel transmitter is a dedicated control channel transmitter and the second dedicated channel transmitter is a fundamental channel transmitter.

16. A channel assigning device for a mobile station in a CDMA (Code Division Multiple Access) communication system, comprising:
 at least first and second dedicated channel receivers for receiving a first dedicated channel in current use and a second dedicated channel set in an idle state, respectively;
 a resource configuration database for storing information about modes of dedicated channels, resource state, and channel spreading code information; and
 a controller for receiving a channel assignment message including a channel assignment mode and a channel spreading code information from a base station through the first dedicated channel receiver, receiving information from the resource configuration database about a dedicated channel mode and spreading code information based on the channel assignment mode and the channel spreading code information included in the channel assignment message, and assigning the information about the dedicated channel mode and the spreading code information to the second dedicated channel.

17. The channel assigning device of claim 16, wherein the first dedicated channel receiver is a fundamental channel receiver and the second dedicated channel receiver is a dedicated control channel receiver.

18. The channel assigning device of claim 16, wherein the first dedicated channel receiver is a dedicated control channel receiver and the second dedicated channel receiver is a fundamental channel receiver.

19. A channel assigning method for a base station, comprising the steps of:
 establishing a first dedicated channel and communicating on the first dedicated channel between the base station and a mobile station; and
 transmitting a channel assignment message including information about a channel assignment mode and channel spreading code information on the first dedicated channel to assign a second dedicated channel different from the first dedicated channel;

20. The channel assigning method of claim 19, wherein the channel assignment mode information is a type of the second dedicated channel assigned to the mobile station and the channel spreading code information is spreading code information for the second dedicated channel to be assigned.

21. The channel assigning method of claim 19, wherein if the first dedicated channel is a fundamental channel, the channel assignment mode information indicates a dedicated control channel.

22. The channel assigning method of claim 19, wherein if the first dedicated channel is a dedicated control channel, the channel assignment mode information indicates a fundamental channel.

23. The channel assigning method of claim 19, wherein the channel spreading code information indicates a Walsh code.

24. The channel assigning method of claim 20, wherein the channel spreading code information indicates a quasi-orthogonal code.

25. A channel assigning method for a mobile station, comprising the steps of:
 communicating with a base station on a first dedicated channel;
 requesting assignment of a second dedicated channel different from the first dedicated channel;
 receiving a channel assignment message including a channel assignment mode and channel spreading code information from the base station in response to the channel assignment request; and
 establishing the second dedicated channel in response to the channel assignment message.

26. The channel assigning method of claim 25, wherein the channel assignment mode information indicates a type of the second dedicated channel to be assigned to the mobile station and the channel spreading code information indicates spreading code information to be assigned to the second dedicated channel.

27. The channel assigning method of claim 25, wherein if the first dedicated channel is a fundamental channel, the channel assignment mode information indicates a dedicated control channel.

28. The channel assigning method of claim 25, wherein if the first dedicated channel is a dedicated control channel, the channel assignment mode information indicates a fundamental channel.

29. The channel assigning method of claim 25, wherein the channel spreading code information indicates a Walsh code.

30. The channel assigning method of claim 25, wherein the channel spreading code information indicates a quasi-orthogonal code.

* * * * *